United States Patent
Otsuka et al.

(10) Patent No.: US 10,255,663 B2
(45) Date of Patent: Apr. 9, 2019

(54) IMAGE PROCESSING DEVICE, IMAGE PROCESSING METHOD, COMPUTER PROGRAM PRODUCT

(71) Applicant: KABUSHIKI KAISHA TOSHIBA, Tokyo (JP)

(72) Inventors: Junji Otsuka, Kanagawa (JP); Takuma Yamamoto, Kanagawa (JP); Nao Mishima, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/677,344

(22) Filed: Aug. 15, 2017

(65) Prior Publication Data
US 2018/0137605 A1    May 17, 2018

(30) Foreign Application Priority Data
Nov. 11, 2016    (JP) ................. 2016-220837

(51) Int. Cl.
*G06T 5/00* (2006.01)
*G06T 7/11* (2017.01)
*G06T 5/50* (2006.01)

(52) U.S. Cl.
CPC ............... *G06T 5/002* (2013.01); *G06T 5/50* (2013.01); *G06T 7/11* (2017.01); *G06T 2207/10028* (2013.01); *G06T 2207/20084* (2013.01); *G06T 2207/20182* (2013.01); *G06T 2207/20221* (2013.01)

(58) Field of Classification Search
CPC ..... G06T 5/50; G06T 5/00; G06T 7/11; G06T 2207/10028; G06T 2207/20084; G06T 2207/20182; G06T 2207/20221; B60W 2420/42; B60W 2420/52
See application file for complete search history.

(56) References Cited

U.S. PATENT DOCUMENTS

| | | | |
|---|---|---|---|
| 2015/0178591 A1* | 6/2015 | Fergus | G06T 5/005 382/157 |
| 2016/0048741 A1* | 2/2016 | Nguyen | G06K 9/6256 382/159 |
| 2016/0174902 A1* | 6/2016 | Georgescu | G06T 7/73 600/408 |
| 2018/0189578 A1* | 7/2018 | Yang | G01C 21/3635 |

OTHER PUBLICATIONS

Dong et al., "Compression Artifacts Reduction by a Deep Convolutional Network", Proc. of International Conference on Computer Vision (ICCV), 2015, 9 pages.

(Continued)

*Primary Examiner* — Ali Bayat
(74) *Attorney, Agent, or Firm* — Nixon & Vanderhye, P.C.

(57) ABSTRACT

According to one embodiment, an image processing device includes a storage and an image processor. The storage stores therein an input image. The image processor segments the input image into a plurality of regions by using a first convolutional neural network (CNN), generates a first image by converting pixel values of pixels in a first region included in the regions into a first value, and performs image processing on the first image by using a second CNN to generate a second image.

6 Claims, 11 Drawing Sheets

(56) References Cited

OTHER PUBLICATIONS

Shelhamer et al., "Fully convolutional networks for semantic segmentation", Proc. of IEEE Conference on Computer Vision and Pattern Recognition (CVPR), 2015, 12 pages.
He, et al. "Deep residual learning for image recognition", Proc. of IEEE Conference on Computer Vision and Pattern Recognition (CVPR), 2016, 9 pages.
Kim et al., "Accurate Image Super-Resolution Using Very Deep Convolutional Networks", Proc. of IEEE Conference on Computer Vision and Pattern Recognition (CVPR), 2016, 9 pages.
Zhang et al. "Beyond a Gaussian Denoiser: Residual Learning of Deep CNN for Image Denoising", arXiv:1608.0398, 2016, 13 pages.

* cited by examiner

IMAGE PROCESSING DEVICE, IMAGE PROCESSING METHOD, COMPUTER PROGRAM PRODUCT

CROSS-REFERENCE TO RELATED APPLICATIONS

This application is based upon and claims the benefit of priority from Japanese Patent Application No. 2016-220837, filed on Nov. 11, 2016; the entire contents of which are incorporated herein by reference.

FIELD

Embodiments described herein relate generally to an image processing device, an image processing method, a computer program product.

BACKGROUND

Images captured by imaging apparatuses such as visible light cameras, infrared cameras, and laser cameras are often subject to noise attributable to such as apparatus itself and external environment, and the noise degrades the image quality. To prevent the image degradation, technologies for reducing noise in an image using convolutional neural networks (CNNs) have been disclosed. In such technologies, CNNs learn, using many natural images to which artificial noise has been added, processing for estimating pre-noise-added images from input images with high accuracy.

However, the conventional technologies have been failed to properly reduce noise included in an image in some cases.

DETAILED DESCRIPTION

Figure 1:
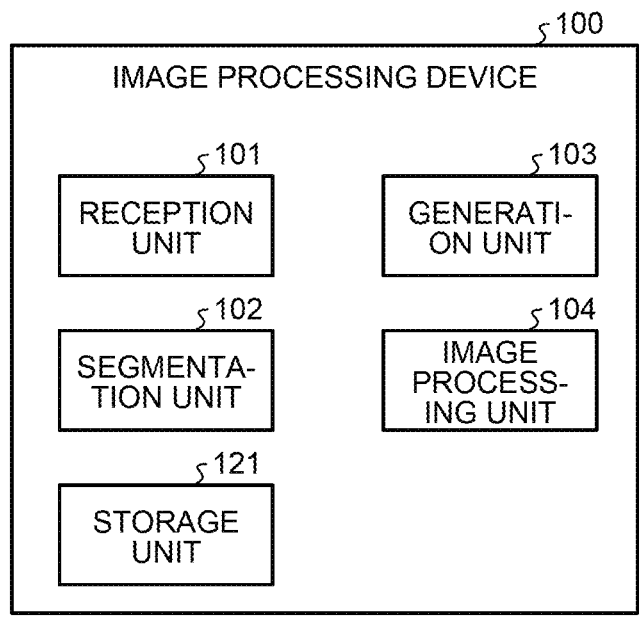
FIG. 1 is a block diagram of an image processing device according to a first embodiment.

According to one embodiment, an image processing device includes a storage and an image processor. The storage stores therein an input image. The image processor segments the input image into a plurality of regions by using a first convolutional neural network (CNN), generates a first image by converting pixel values of pixels in a first region included in the regions into a first value, and performs image processing on the first image by using a second CNN to generate a second image.

The following fully describes preferred embodiments of an image processing device according to the present disclosure with reference to the accompanying drawings.

A CNN performs a convolution operation on an input image such that a weighted sum of neighboring pixel values of a pixel of interest is output with the position of the operation shifting from one pixel of interest to another. The pixel included in the input image may have a plurality of channels. The neighboring pixel values of each pixel of interest are weighted by the same value across the entire image irrespective of the position of the pixel of interest. Thus, the input/output response of the convolution operation is independent of the position in an image. The CNN is based on such position-independent convolution operations, and thus, it is difficult to change the type of processing in a CNN in accordance with the position in an image. When, for example, different types of noise occur in different regions in an image, it is desirable to perform different types of noise reduction processing on the regions. In such a case, however, the conventional technologies have been failed to properly reduce noise in some regions.

Consider, for example, noise reduction for a distance image captured by a light detection and ranging (LIDAR) system that measures a distance by analyzing reflected laser light. This distance image will be referred to as a LIDAR distance image. A LIDAR distance image includes noisy regions and less noisy regions. Examples of noisy regions include a region of the sky or a sloped surface from which the LIDAR system fails to receive reflected laser light correctly. Such regions contain a high magnitude of noise. Regions from which the LIDAR system can easily receive reflected laser light contain a smaller magnitude of noise. For example, a region containing a high magnitude of noise includes many pixels having a low signal-to-noise (SN) ratio, which is defined as the ratio of received reflected laser light (S) to the noise (N) such as received ambient light or noise from circuitry. For example, a region containing a high magnitude of noise exhibits a small average of the S/N ratios of the pixels. For example, a region containing a high magnitude of noise is a region including a pixel having a large measurement error. For example, a region containing a high magnitude of noise is a region having a high frequency of noise.

To properly reduce noise of an input image, it is desirable to specify regions estimated to be noisy and perform appropriate noise removal processing for each noisy region. For example, different types of noise removal processing are performed on different regions. However, it is difficult for a CNN, which performs a position-independent convolution operation, to learn both specification of regions and branch processing simultaneously. If a CNN learns noise reduction processing for a LIDAR distance image, the CNN focuses on noise reduction processing for noisy regions containing a relatively high magnitude of noise, which leads to insufficient reduction in noise of less noisy regions containing a smaller magnitude of noise. In addition, the boundary between a noisy region and a less noisy region is more likely to be blurred because the convolution operation is performed across the two regions.

First Embodiment

An image processing device according to a first embodiment segments an input image into regions and generates a first image by converting values of one or more certain regions in the input image into a first value in accordance with the result of the region segmentation in order to embed information for distinguishing the regions in the input image. The image processing device then performs image processing such as noise reduction processing using a CNN on the first image containing the embedded information for distinguishing the regions. This configuration enables the image processing device to perform more accurate image processing. In noise reduction processing, for example, the image processing device can reduce noise in a certain region more accurately.

Although the input image is described as a LIDAR distance image in part of the description below, the input image is not limited to the LIDAR distance image. The input image may be a distance image obtained by a method other than LIDAR. The distance image is an image including pixels each having a value representing a distance. The input image may be an image captured by an imaging apparatus such as a visible light camera or an infrared camera other than a LIDAR apparatus.

FIG. 1 is a block diagram illustrating an example of a functional configuration of this image processing device 100 according to the first embodiment. As illustrated in FIG. 1, the image processing device 100 includes a reception unit 101, a segmentation unit 102, a generation unit 103, an image processing unit 104, and a storage unit 121.

The reception unit 101 receives an input of an image to be processed. When, for example, the input image is a LIDAR distance image, the reception unit 101 receives the LIDAR distance image from a measurement device that measures distances using the LIDAR method and outputs a distance image. The measurement device may be provided internal of or external to the image processing device.

The storage unit 121 stores therein various types of information for use in various types of processing performed in the image processing device 100. For example, the storage unit 121 stores therein a received input image.

The segmentation unit 102 segments an input image into a plurality of regions. For example, the segmentation unit 102 segments an input image into a plurality of regions by using a CNN (first CNN). The method for segmenting an input image into a plurality of regions is not limited to the method using a CNN, but any other method may be used. For example, the segmentation unit 102 may use a method using a machine learning model other than the CNN, such as a support vector machine (SVM), or a method of segmenting an input image into regions in accordance with a result of comparison between a pixel value or a statistical value of pixel values and a threshold. Examples of the statistical value of pixel values include dispersion and average of pixel values within a region such as a rectangular region or a circular region. The segmentation unit 102 segments an input image into, for example, a region estimated to be a noisy region and a region other than the noisy region.

The generation unit 103 generates an image (first image) by converting pixel values of pixels in a certain region (first region) included in the regions into a certain value (first value). Instead of using the first value, a value included in the first range may be used.

The image processing unit 104 performs image processing on the generated image (first image) by using a CNN (second CNN) that differs from the CNN (first CNN) used by the segmentation unit 102 to generate an image (second image). The image processing may be any type of image processing that uses a CNN. The image processing unit 104 performs, for example, noise reduction, super resolution, interpolation, or other types of image processing. The following mainly describes noise reduction processing performed as an example of the image processing. The first CNN and the second CNN may implement the same method or different methods.

One or more or all of the functions of the reception unit 101, the segmentation unit 102, the generation unit 103, and the image processing unit 104 may be implemented by one functional unit. For example, the image processing unit 104 may further include the functions of the segmentation unit 102 and the generation unit 103. In other words, the image processing unit 104 may be configured to segment an input image into a plurality of regions by using the first CNN, generate a first image by converting pixel values of the pixels in a certain region (first region) included in the regions into a certain value (first value), and perform image processing on the first image by using the second CNN to generate a second image.

The reception unit 101, the segmentation unit 102, the generation unit 103, and the image processing unit 104 may be implemented, for example, by causing one or more processors such as a central processing unit (CPU) to execute a computer program, that is, implemented by software, may be implemented by hardware such as one or more integrated circuits (ICs), or may be implemented by both software and hardware.

Figure 2:
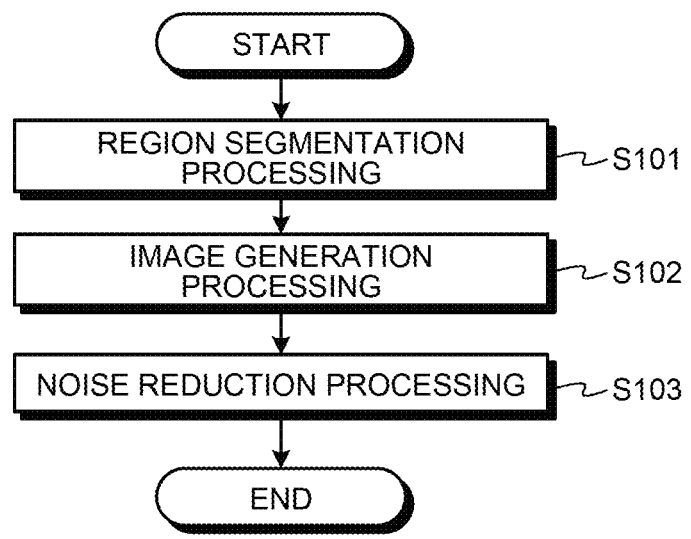
FIG. 2 is a flowchart of image processing according to the first embodiment.

Described next is image processing performed by the image processing device 100 according to the first embodiment configured as described above with reference to FIG. 2. FIG. 2 is a flowchart illustrating an example of image processing according to the first embodiment.

An input image to be processed is received by the reception unit 101. First, the segmentation unit 102 performs region segmentation processing on the input image (Step S101). In the region segmentation processing, the segmentation unit 102 receives an input image containing noise. The segmentation unit 102 outputs labels that are the signs for distinguishing to which region the pixels of the input image belong by using the first CNN. The first CNN receives the input image at an input layer and outputs scores of each pixel in the input image with respect to the labels from an output layer. The scores represent, for example, probabilities or likelihoods as to how probable or likely a distance value of a pixel belongs to the respective regions with the labels. The first CNN may have the same input/output architecture as that of a fully convolutional network (FCN) described by Jonathan Long, Evan Shelhamer, and Trevor Darrell. "Fully convolutional networks for semantic segmentation." Proc. of IEEE Conference on Computer Vision and Pattern Recognition (CVPR), 2015 (Non-patent Literature 2), for example. Instead of the FCN described in Non-patent Literature 2, a residual net (ResNet) described by Kaiming He, et al. "Deep residual learning for image recognition." Proc. of IEEE Conference on Computer Vision and Pattern Recognition (CVPR), 2016 (Non-patent Literature 3) may be used as the first CNN, or other CNNs used in recognition processing may be used.

The segmentation unit 102 gives each pixel in the input image a label among the plurality of labels for which the first CNN has output the highest score of the pixel. The types of the labels (the types of the regions) may be previously determined by, for example, a designer.

Figure 3:
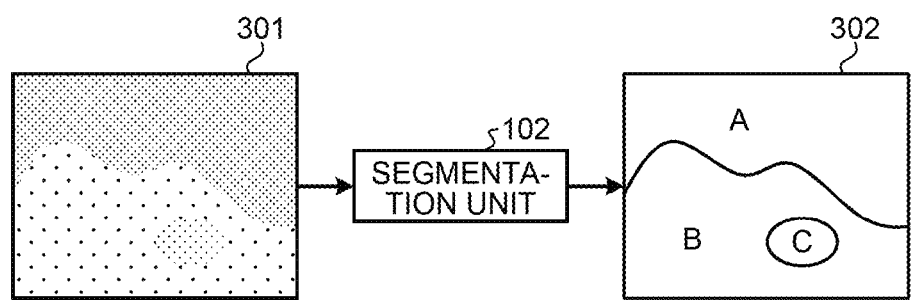
FIG. 3 is a diagram illustrating an example of region segmentation processing.

FIG. 3 is a diagram illustrating an example of region segmentation processing. When, for example, an input image 301 is a LIDAR distance image, the segmentation unit 102 may segment the input image 301 into three regions that are a noisy region (region A in FIG. 3), such as the sky, including no object, a noisy region (region C in FIG. 3), such as a sloped surface, including an object, and a less noisy region (region B in FIG. 3). An output 302 in FIG. 3 schematically illustrates the three regions A, B, and C into which the input image has been segmented. The regions A, B, and C are labeled as, for example, "a noisy region (without object)", "a less noisy region", and "a noisy region (with object)", respectively.

The method of segmentation is not limited to this. For example, the region A and the region C in FIG. 3 may be labeled as one noisy region. The input image may be segmented in accordance with, for example, attributes such as people and roads, intensity of noise, the degree of brightness, foreground and background, whether the subsequent image processing is needed, or other certain criteria determined by the designer.

For example, the first CNN is previously created by learning using an input image to which correct labels of the regions are added indicating to which region each pixel belongs. Although at least an input image is input to the first CNN, an image other than the input image may be additionally input thereto. In the case of noise reduction on a LIDAR distance image, for example, a reflected intensity image representing the intensity of reflected laser light and/or an image captured by a visible light camera may be additionally input thereto. In this case, the first CNN may be created by learning using an input image and an image other than the input image. The segmentation unit 102 inputs an input image and an image other than the input image to the created first CNN to segment the input image into a plurality of regions.

Referring back to FIG. 2, the generation unit 103 performs image generation processing (Step S102). In the image generation processing, the generation unit 103 generates an image (first image) by replacing pixel values of a certain region (first region) to which a certain label is added with a certain value (first value). For example, the generation unit 103 picks a region labeled as a noisy region as the certain region, and generates an image by replacing the pixel values of this region with a certain value. The number of the certain labels may be one or more than one. If a plurality of certain labels are provided, pixel values may be replaced with a plurality of certain different values.

The image processing unit 104 receives the first image to perform noise reduction processing using the second CNN, and outputs an image (second image) (Step S103). In the noise reduction processing, a second image containing reduced noise of one or more regions in the first image is output by using the second CNN.

The second CNN receives the first image at an input layer, and outputs the second image from an output layer. For the second CNN, for example, an artifacts reduction convolutional neural network (AR-CNN) described by Chao Dong, Yubin Deng, Chen Change Loy, and Xiaoou Tang. "Compression artifacts reduction by a deep convolutional network." Proc. of International Conference on Computer Vision (ICCV), 2015 (Non-patent Literature 1), very deep super resolution (VDSR) described by Jiwon Kim, Jung Kwon Lee, and Kyoung Mu Lee. "Accurate image super-resolution using very deep convolutional networks." Proc. of IEEE Conference on Computer Vision and Pattern Recognition (CVPR), 2016 (Non-patent Literature 4), and a combined architecture of VDSR and ResNet may be used. The image processing unit 104 may use other CNNs used for image processing as the second CNN. Embedding a first value in the second image as region information allows the second CNN to easily distinguish regions and reduce noise in the certain region.

Figure 4:
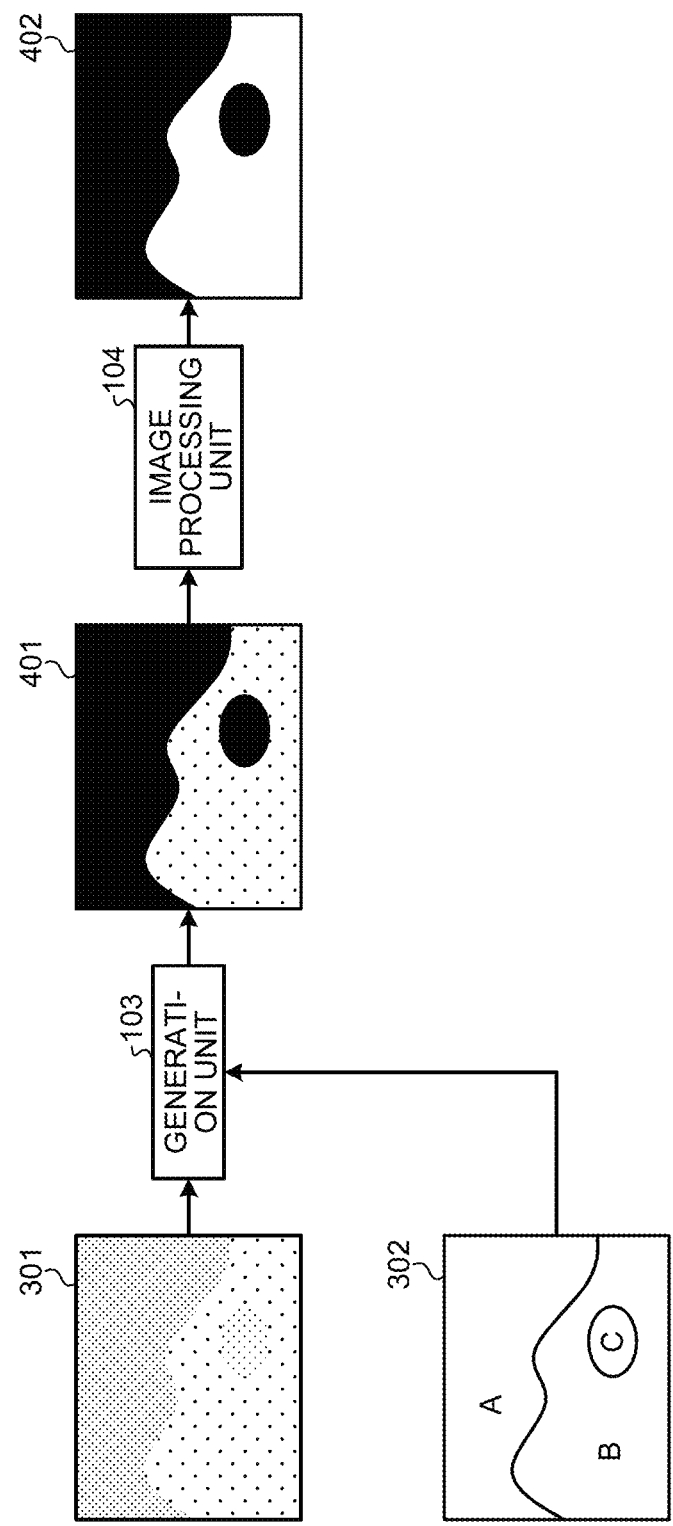
FIG. 4 is a diagram illustrating an example of image generation processing and noise reduction processing.

FIG. 4 is a diagram illustrating an example of image generation processing and noise reduction processing. The label (certain label) to be replaced with the first value in the image generation processing, the first value, and the label of the region to be subjected to the noise reduction processing may be previously determined by the designer.

In the case of noise reduction on a LIDAR distance image, for example, the generation unit 103 generates a first image 401 by replacing the pixel values in the region A and the region C, which are noisy regions, with 0 as a first value as illustrated in FIG. 4. The image processing unit 104 inputs the first image to the second CNN that has learned noise reduction for a less noisy region. This configuration allows the image processing unit 104 to output a second image 402 containing reduced noise of the less noisy region B.

The number of regions from which noise is reduced in the second CNN may be one or more than one, and the regions may include the region the pixel values of which have been replaced with the first value. For example, the true value of the noisy region C surrounded by the less noisy region B can be estimated from the surrounding pixel values. Thus, the image processing unit 104 may perform noise reduction processing on the less noisy region and also perform interpolation on the region C as image processing.

Figure 5:
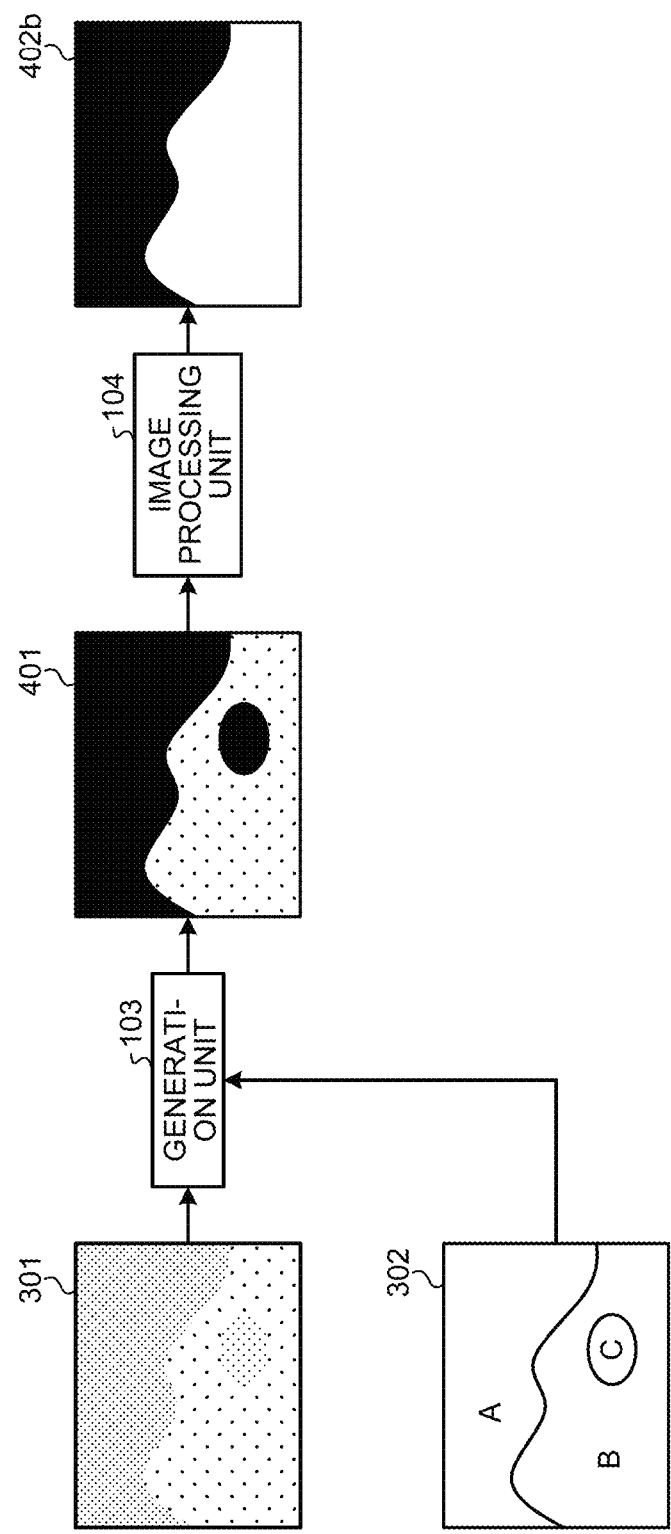
FIG. 5 is a diagram illustrating another example of image generation processing and noise reduction processing.

FIG. 5 is a diagram illustrating an example of image generation processing and noise reduction processing configured as described above. The image processing unit 104 can reduce noise in the less noisy region B and interpolate the pixel values in the region C by inputting the first image to the second CNN that has learned noise reduction and interpolation, and can output a second image 402b. The information that the region C is a noisy region can be delivered to the CNN by embedding the first value in the input image, thereby allowing the CNN to perform branch processing that a typical CNN performs unsuccessfully.

Figure 6:
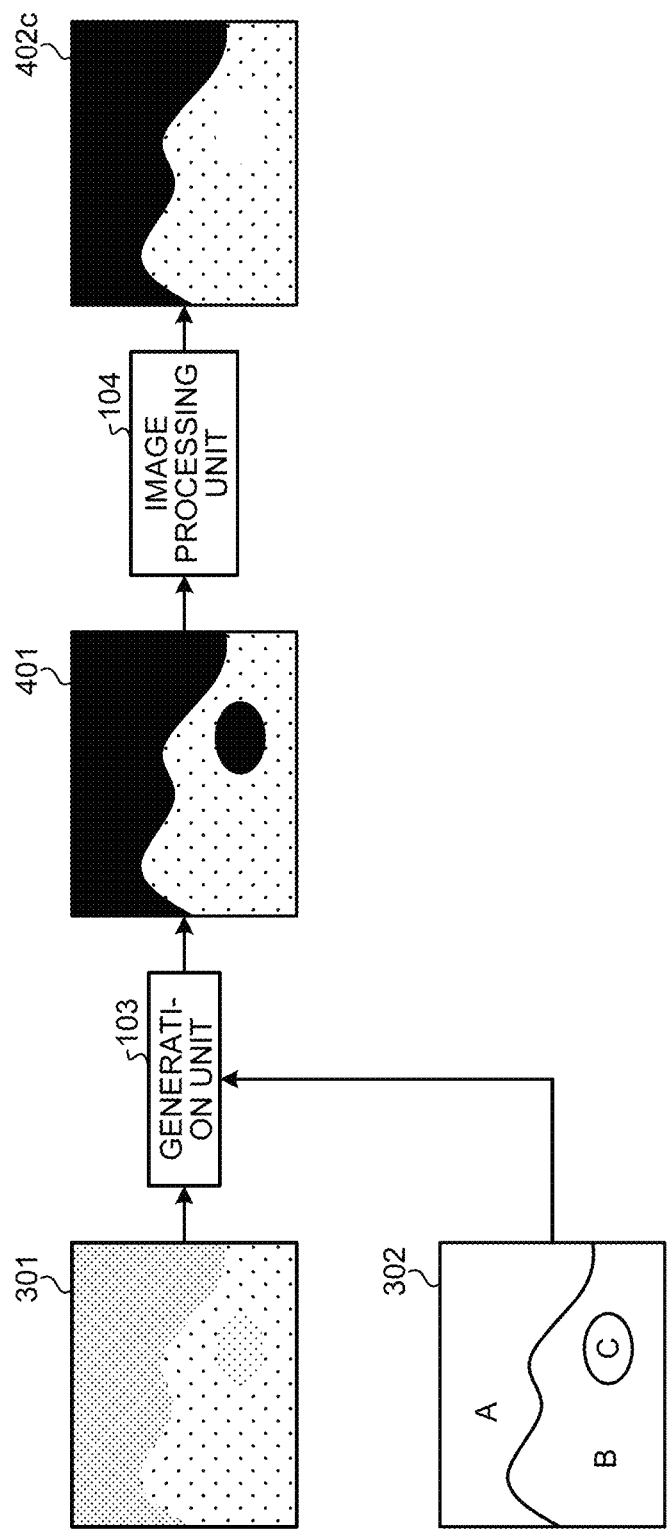
FIG. 6 is a diagram illustrating an example of performing interpolation on a noisy region as image processing.

FIG. 6 is a diagram illustrating an example of performing interpolation on a noisy region as image processing without performing noise reduction processing. The image processing unit 104 inputs the first image to the second CNN that has learned interpolation, and thus can output a second image 402c including interpolated pixel values of the region C.

Figure 7:
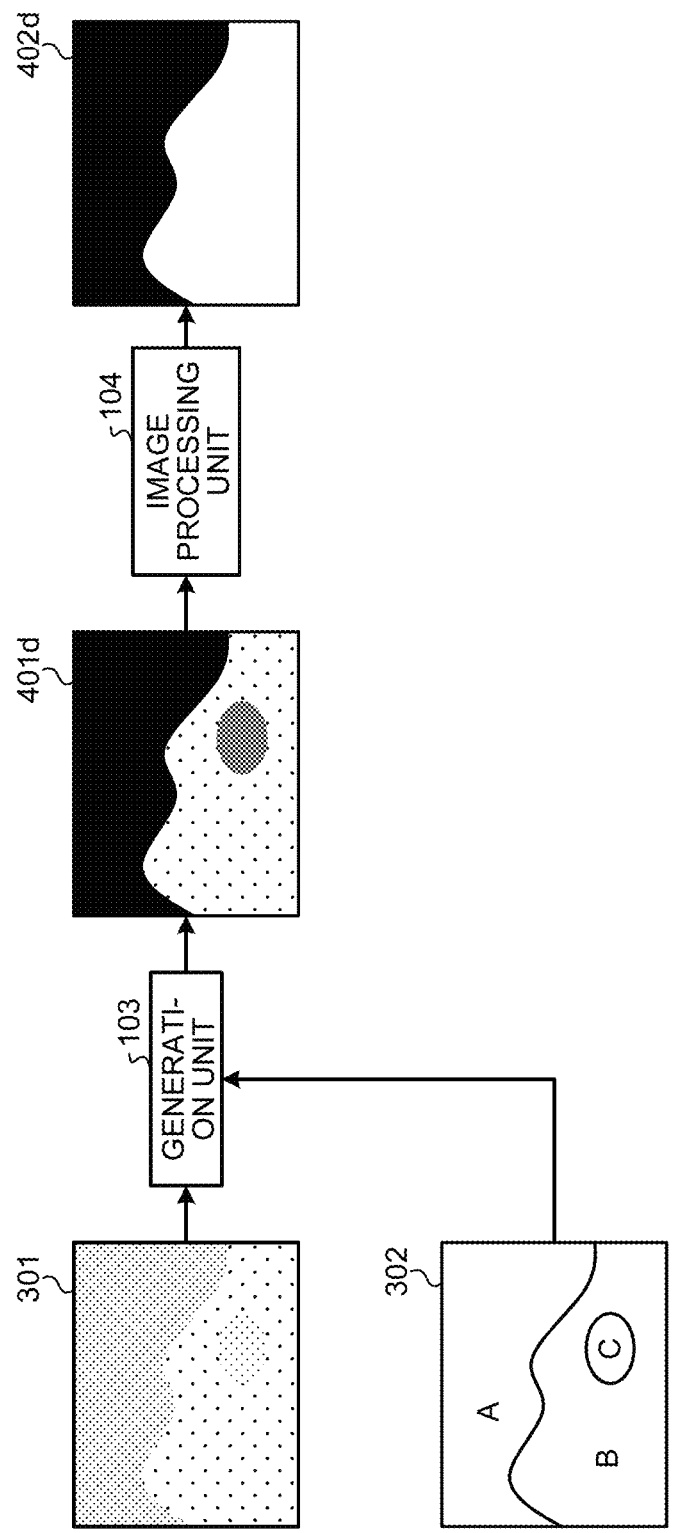
FIG. 7 is a diagram illustrating an example of using different first values on different regions.

The first value may be changed in accordance with the regions, and may be a value other than 0. FIG. 7 is a diagram illustrating an example of using different first values in different regions. The generation unit 103 generates a first image 401d by giving, for example, 0 to the region A as a first value and giving a value other than 0 to the region B as another first value. The image processing unit 104 outputs a second image 402d by inputting the first image 401d to the second CNN. In the second image 402d, for example, noise in the less noisy region B is reduced. In the second image 402d, for example, the pixel value in the noisy region C is interpolated. In the second image 402d, for example, the noise in the less noisy region B may be reduced and the pixel values of the noisy region C may be interpolated.

Replacing pixel values in an input image with a first value corresponds to providing a CNN, which is not suitable for branch processing, with such information that allows the CNN to easily distinguish one region to another. Therefore, it is appropriate to select, as the first value, a value that appears less frequently in the region on which noise reduction processing is performed in the second CNN.

In a LIDAR distance image, the true value of a noisy region such as the sky is unknown. Suppose that the correct distance value in this region is 0, and the pixel values in this noisy region are replaced with the first value 0. With this operation, it can be considered that noise in the noisy region is successfully reduced. Thus, additional noise reduction processing is not necessary.

Although at least a first image is input to the second CNN, an image other than the first image may be additionally input thereto. In the case of noise reduction on a LIDAR distance image, for example, an input image, a reflected intensity image representing the intensity of reflected laser light, and/or an image captured by a visible light camera may be additionally input thereto. In this case, the second CNN is created by learning using a first image and an image other than the first image. The image processing unit 104 performs image processing by inputting a first image and an image other than the first image to the second CNN created as described above, and then outputs a second image.

The first CNN and the second CNN are trained by using a plurality of pieces of learning data indicating the combination of an input image containing noise, a correct image containing no noise, and the correct labels of the regions to which the pixels in the input image belong. The first CNN and the second CNN may be trained separately or simultaneously.

In separate training, the first CNN is trained by minimizing an error function by which a smaller value is computed as a label output in response to an input of an input image comes closer to the correct label, which is described in, for example, Non-patent Literature 2. For example, a cross-entropy error function widely used in image recognition can be used as the error function. To minimize the error function, the gradient descent method, the conjugated gradient method, Newton's method, or other minimization methods can be used, for example.

In separate training for the second CNN, a first image is generated from an input image by using correct labels or labels output from the first CNN that has previously trained, and the second CNN is trained by minimizing an error function by which a smaller value is computed as a second image output by the second CNN in response to an input of the first image comes closer to the correct image, which is described in, for example, Non-patent Literature 1. For example, a mean squared error function and a mean absolute error function can be used as the error function.

In simultaneous training for the first CNN and the second CNN, the first CNN and the second CNN are trained by minimizing the weighted sum of the error function that measures errors between the correct labels and labels output from the first CNN and the error function that measures the error between the correct image and the second image output from the second CNN in response to an input of the first image generated by using the labels output from the first CNN. The weight may be determined by the designer as appropriate. The minimization is performed in the same manner as in the separate training.

As described above, the image processing device according to the first embodiment segments an input image into a plurality of regions, and generates a first image by converting values in a certain region of the regions to be subjected to image processing into a first value. The image processing device then performs image processing such as noise reduction on the first image by using a CNN. With this configuration, more accurate image processing can be performed.

Second Embodiment

The image processing device according to the first embodiment performs image processing using a single CNN (second CNN) on a single image (first image) that has been segmented into regions. Such an image processing device as configured above, for example, cannot perform image processing using different CNNs on different regions. An image processing device according to a second embodiment generates a plurality of first images, applies different second CNNs to the respective first images to obtain a plurality of second images, and combines the resulting second images to generate a third image. This configuration enables the image processing device to perform different types of image processing on different regions.

Figure 8:
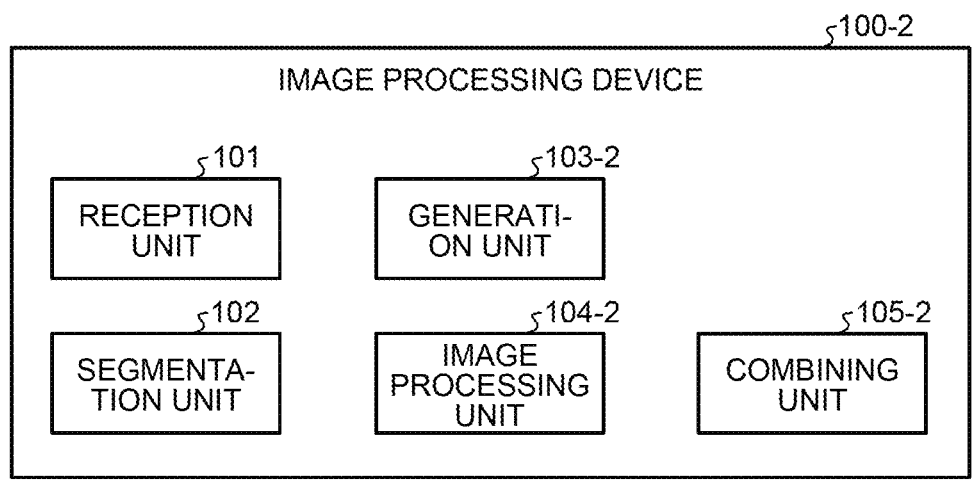
FIG. 8 is a block diagram of an image processing device according to a second embodiment.

FIG. 8 is a block diagram illustrating an example of a configuration of this image processing device 100-2 according to the second embodiment. As illustrated in FIG. 8, the image processing device 100-2 includes the reception unit 101, the segmentation unit 102, a generation unit 103-2, an image processing unit 104-2, and a combining unit 105-2.

The second embodiment differs from the first embodiment in the functions of the generation unit 103-2 and the image processing unit 104-2, and the newly included combining unit 105-2. Other configurations and functions are the same as those illustrated in the block diagram of the image processing device 100 according to the first embodiment in FIG. 1, and thus are referred to as the same signs and detailed explanation thereof is omitted herein.

The generation unit 103-2 differs from the generation unit 103 in the first embodiment in that it generates a plurality of first images. Any number of first images may be generated. A part of a generated first image or the entire first image may be different from or identical to other generated first images.

The image processing unit 104-2 performs image processing on each of the generated first images by using any one of a plurality of second CNNs to generate a plurality of second images.

The combining unit 105-2 combines the generated second images to generate a third image. For example, the combining unit 105-2 combines the second images such that it computes a weighted average of pixel values of respective pixels in the second images and uses the computed value as the pixel value of the corresponding pixel in the third image.

One or more or all of the functions of the reception unit 101, the segmentation unit 102, the generation unit 103-2, the image processing unit 104-2, and the combining unit 105-2 may be implemented by one functional unit. For example, the image processing unit 104-2 may further include the functions of the segmentation unit 102, the generation unit 103-2, and the combining unit 105-2. In other words, the image processing unit 104-2 may be configured to segment an input image into a plurality of regions by using a first CNN, generate a plurality of first images by converting pixel values of the pixels in a certain region (first region) included in the regions into a certain value (first value), perform image processing on each of the first images by using any one of a plurality of second CNNs to generate a plurality of second images, and combine the second images to generate a third image.

Figure 9:
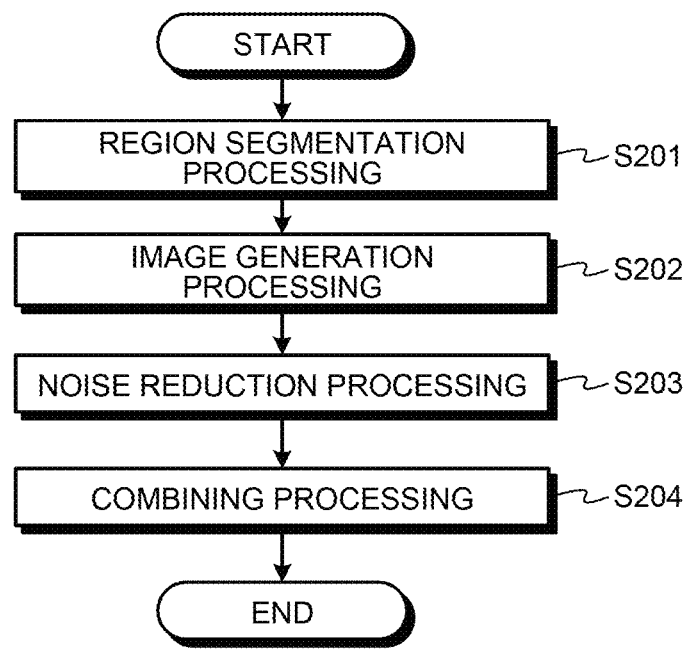
FIG. 9 is a flowchart of image processing according to the second embodiment.

Described next is image processing performed by the image processing device 100-2 according to the second embodiment configured as described above with reference to FIG. 9. FIG. 9 is a flowchart illustrating an example of the image processing according to the second embodiment.

The region segmentation processing at Step S201 is performed in the same manner as the processing performed by the image processing device 100 according to the first embodiment at Step S101, and thus, explanation thereof is omitted.

The generation unit 103-2 performs image generation processing (Step S202). In the second embodiment, the generation unit 103-2 generates a plurality of first images in the image generation processing. The image processing unit 104-2 then performs noise reduction processing on each of the first images by using a corresponding second CNN of a plurality of second CNNs to output an image (second image) (Step S203). The noise reduction processing reduces noise in certain regions of the first images, and a plurality of second images including the certain noise-reduced regions are output by using the corresponding second CNNs. For example, the noise reduction processing is performed on the first images by using different second CNNs that have been trained to reduce noise. A part of a second CNN or the entire second CNN may be identical to other second CNNs. The process of generating each of the first images and the process performed by each of the second CNNs are the same as those performed in the first embodiment.

A region in a first image in which the pixel values are replaced with the first value may be the same as a region in another first image in which the pixel values are replaced with the first value. A region processed by a second CNN may overlap with a region processed by another second CNN. Regions in the first images in which pixel values are replaced with the first value, the first value, and regions processed by the second CNNs may be previously determined by the designer.

Although at least one first image is input to each of the second CNNs, an image other than the first image may be additionally input thereto. In the case of noise reduction on a LIDAR distance image, for example, the second CNN may additionally receive an input image, a second image output from another second CNN, a reflected intensity image representing the intensity of reflected laser light, and/or an image captured by a visible light camera. In this case, the second CNN is created by learning using a first image and an image other than the first image. The image processing unit 104-2 inputs a first image and an image other than the first image to the second CNN created as described above, and performs image processing to output a second image.

Figure 10:
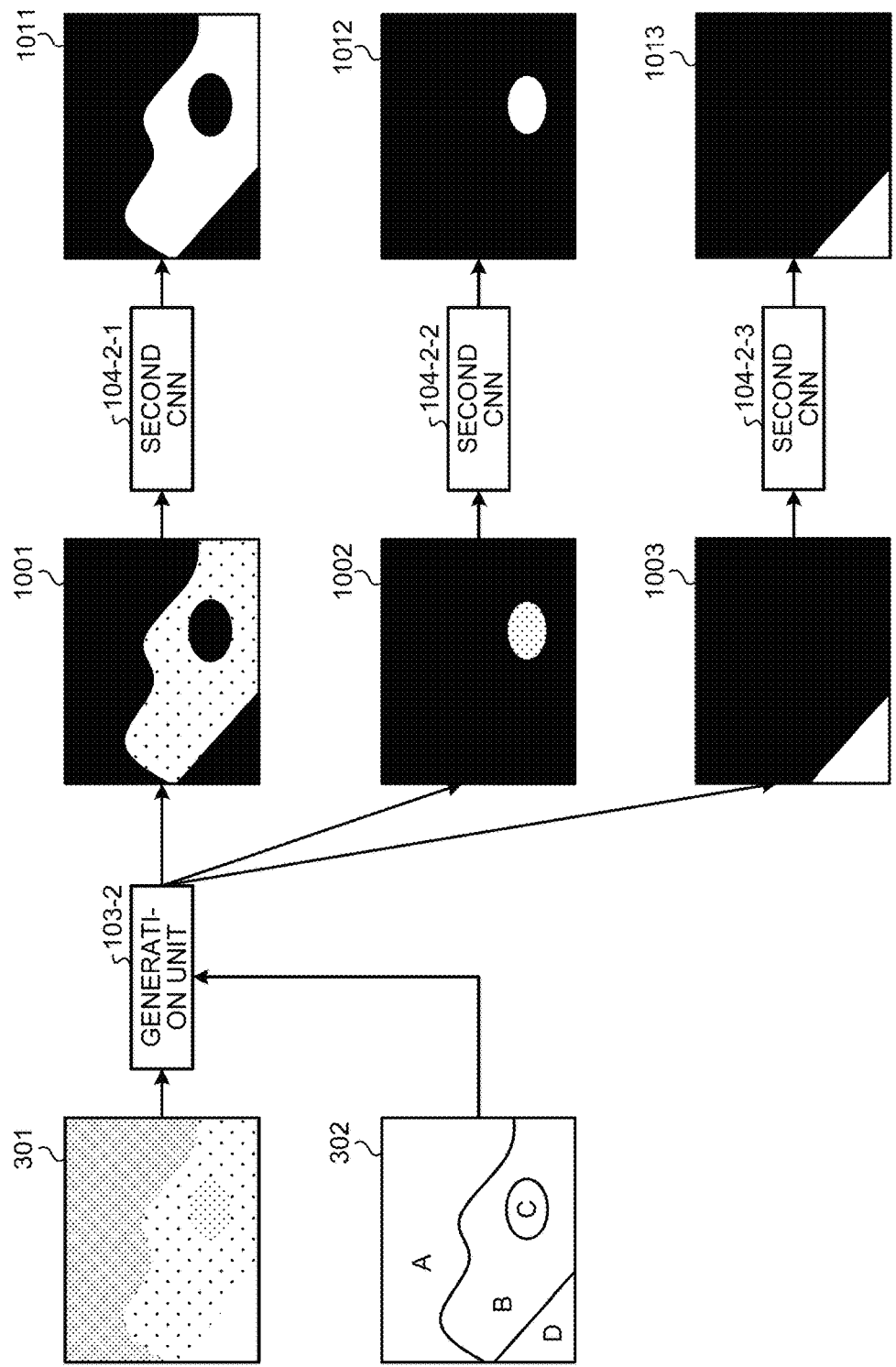
FIG. 10 is a diagram illustrating an example of image generation processing and noise reduction processing.

FIG. 10 is a diagram illustrating an example of image generation processing and noise reduction processing in the second embodiment. The generation unit 103-2 generates a plurality of first images 1001, 1002, and 1003 in the second embodiment. The first image 1001 is generated by, for example, replacing pixel values of the regions A, C, and D with 0. The first image 1002 is generated by replacing pixel values of the regions A, B, and D with 0. The first image 1003 is generated by replacing pixel values of the regions A, B, and C with 0.

The image processing unit 104-2 applies second CNNs 104-2-1, 104-2-2, and 104-2-3 to the first images 1001, 1002, and 1003, respectively, to generate second images 1011, 1012, and 1013, respectively.

The second CNN 104-2-1 is used, for example, to reduce noise in the regions A and B. With the second CNN 104-2-1, the second image 1011 including the noise-reduced regions A and B is generated. The second CNN 104-2-2 is used, for example, to reduce noise in the region C. With the second CNN 104-2-2, the second image 1012 including the noise-reduced region C is generated. The second CNN 104-2-3 is used, for example, to reduce noise in the region D. With the second CNN 104-2-3, the second image 1013 including the noise-reduced region D is generated. For example, which second CNN processes which label of the regions is previously determined by the designer.

Referring back to FIG. 9, the combining unit 105-2 combines a plurality of second images to generate a third image including certain noise-reduced regions (Step S204). For example, the combining unit 105-2 generates the third image by using the pixel values of the noise-reduced regions in the respective second images as the pixel values of the third image. In the example of FIG. 10, the combining unit 105-2 may generate a third image by using the pixel values of the regions A and B in the second image 1011, the pixel value of the region C in the second image 1012, and the pixel value of the region D in the second image 1013 as the pixel values of the corresponding regions in the third image.

The image processing unit 104-2 may reduce noise of the regions overlapping in the second images. In this case, for example, the combining unit 105-2 computes a weighted average of the pixel values of the respective pixels in the second images and uses the computed value as the pixel value of the corresponding pixel in the third image. All the second images may be weighted equally by a constant value, or a larger value may be used for a second CNN that can perform more accurate processing on a target region.

Figure 11:
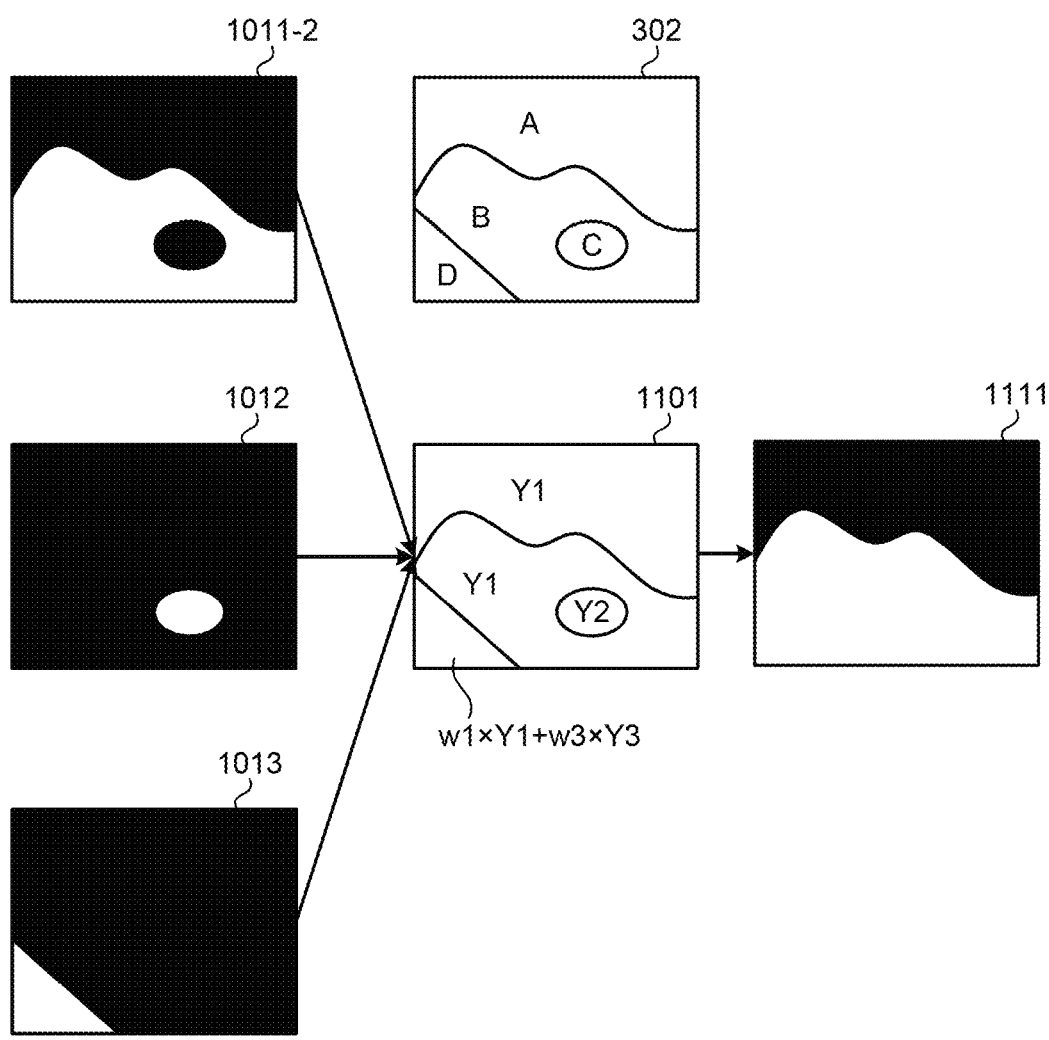
FIG. 11 is a diagram illustrating an example in which noise-reduced regions overlap.

FIG. 11 is a diagram illustrating an example in which noise-reduced regions overlap. A second image 1011-2 includes noise-reduced regions A, B, and D. A second image 1013 also includes the noise-reduced region D. In other words, the region in which noise has been reduced in the second image 1011-2 and that of the second image 1013 (region D) overlap. To generate a third image 1111, the combining unit 105-2 uses a weighted average of the pixel value of the region D in the second image 1011-2 and the pixel value of the region D in the second image 1013 as the pixel value of the region corresponding to the region D in the third image 1111.

An image 1101 in FIG. 11 schematically illustrates from which image the pixel values for the respective regions come. "Y1", "Y2", and "Y3" indicate respectively that the pixel value of the second image 1011-2, the pixel value of the second image 1012, and the pixel value of the second image 1013 are used. "w1" and "w3" represent the weights for the pixel values of the second image 1011-2 and the second image 1013, respectively.

Figure 12:
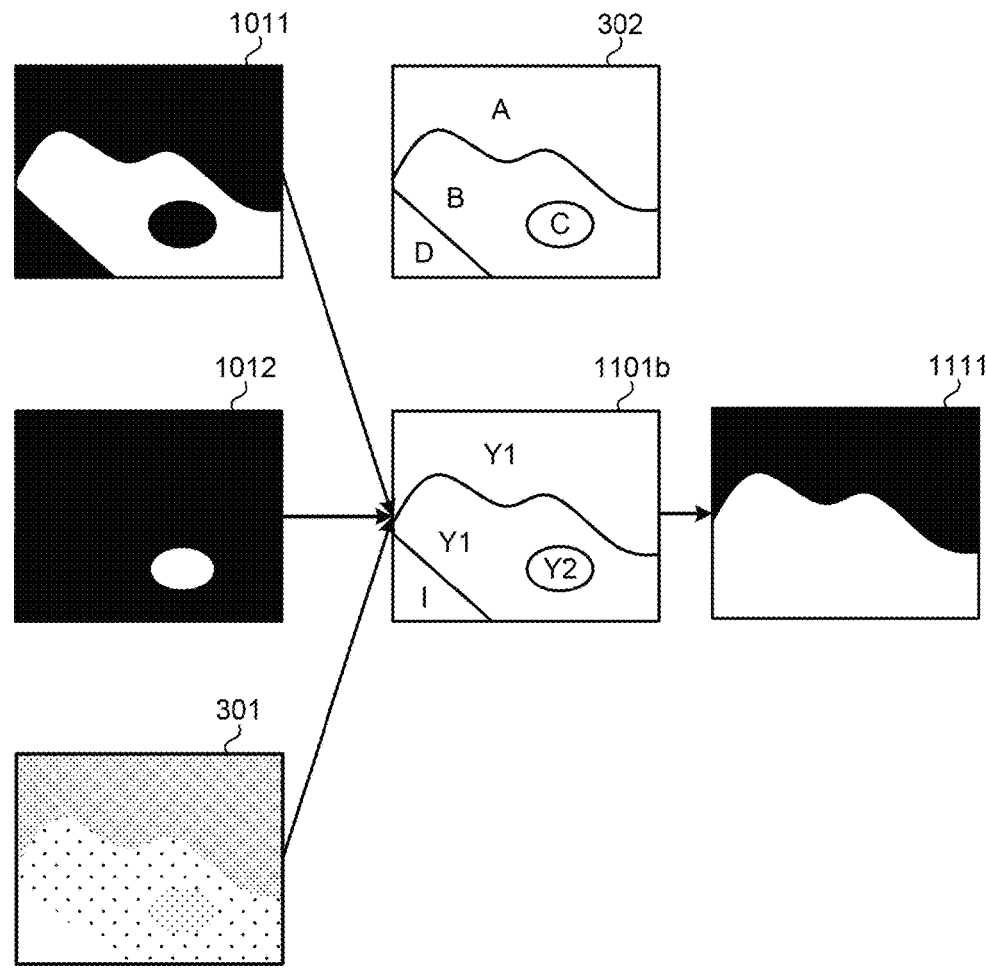
FIG. 12 is a diagram illustrating an example in which a pixel value of a region in an input image is combined.

If there is a region on which no noise reduction processing is performed by any of the second CNNs, the combining unit 105-2 may combine the images by using the pixel value of the region in the input image as the pixel value of the region in the third image. FIG. 12 is a diagram illustrating an example in which a pixel value of a region in an input image is combined. An image 1101*b* schematically illustrates from which image the pixel values for the respective regions come. "I" indicates that a pixel value in the input image is used. In the example as illustrated in the image 1101*b*, the pixel value in the input image is used for the pixel value of the region corresponding to the region D in the third image. If there is a region for which no noise reduction processing is required in the input image, the pixel value of the region in the input image can be output as the pixel value of the region in the third image.

As described above, according to the first and the second embodiments, image processing using CNNs can be more accurately performed.

Figure 13:
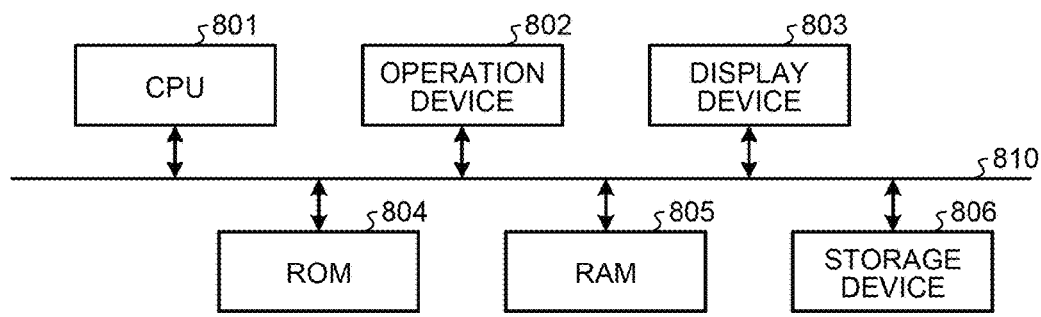
FIG. 13 is a diagram illustrating a hardware configuration of the image processing device.

Described next is a hardware configuration of the image processing device according to the first and the second embodiments with reference to FIG. 13. The image processing device includes a CPU 801, an operation device 802, a display device 803, a read only memory (ROM) 804, a random access memory (RAM) 805, and a storage device 806. These components are connected via a bus 810.

The CPU 801 performs various types of processing in a certain area of the RAM 805 as a working area with various control programs that are previously stored in the ROM 804, and centrally controls the operations of the units that configure the image processing device. The CPU 801 implements the functions of the units described above with a computer program that is previously stored in the ROM 804. The operation device 802 converts an image into an electrical signal and outputs the signal to the CPU 801. The display device 803 is, for example, a display device that displays various types of information.

The ROM 804 stores therein a computer program for controlling the image processing device and various types of setting information in a read-only manner. The RAM 805 is a storage medium such as a synchronous dynamic random access memory (SDRAM), and functions as a working area of the CPU 801 and serves as a buffer, for example. The storage device 806 includes a magnetically or optically writable recording medium, and stores therein image signals input through the operation device 802 and data such as images input from outside via, for example, a communication unit (not illustrated) or an interface (I/F). The hardware configuration is not limited to this. For example, at least a part of the function of the units of the image processing device may be implemented by a dedicated hardware circuit (e.g., a semiconductor integrated circuit).

The computer program executed in the image processing device according to the first or the second embodiment is embedded and provided in the ROM 804, for example.

The computer program executed in the image processing device according to the first or the second embodiment may be recorded in a computer-readable recording medium such as a compact disc read only memory (CD-ROM), a flexible disk (FD), a compact disc recordable (CD-R), and a digital versatile disc (DVD), as an installable or executable file and provided as a computer program product.

The computer program executed in the image processing device according to the first or the second embodiment may be stored in a computer connected to a network such as the Internet and provided by being downloaded via the network. Furthermore, the computer program executed in the image processing device according to the first or the second embodiment may be provided or distributed via a network such as the Internet.

The computer program executed in the image processing device according to the first or the second embodiment can cause a computer to function as the units of the image processing device described above. The computer can execute the computer program such that the CPU 801 reads the computer program from a computer-readable storage medium to a main memory.

Figure 14:
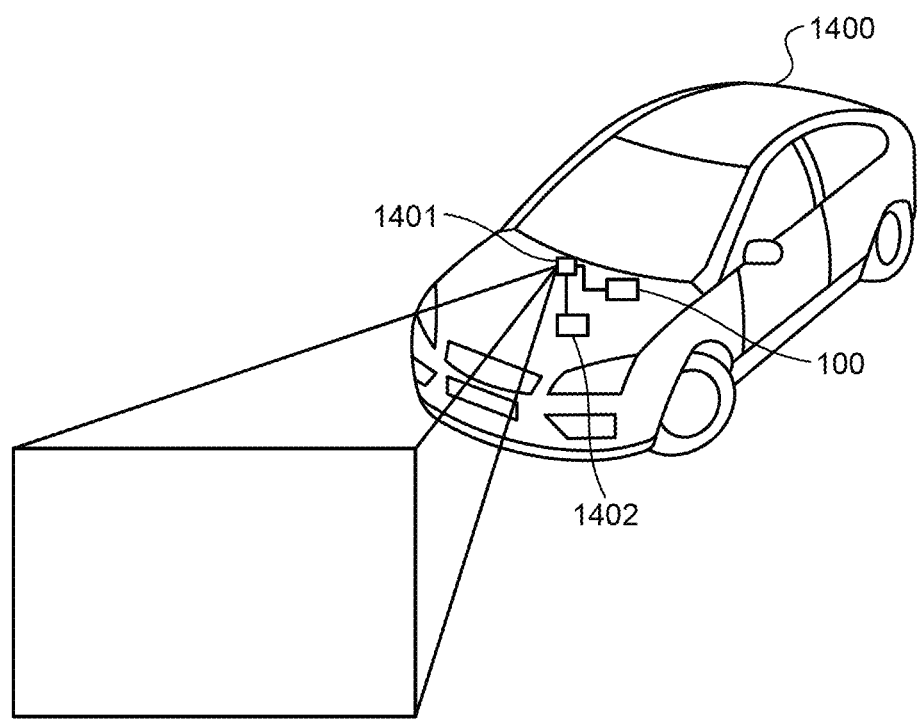
FIG. 14 is a diagram illustrating an example of a configuration of a vehicle to which the image processing device is installed.

For example, the image processing device according to the embodiments above can be used as a part of a drive control system for a vehicle that autonomously drives in accordance with a distance image or other information. FIG. 14 is a diagram illustrating an example of a configuration of a vehicle 1400 including the image processing device according to the embodiments above.

The vehicle 1400 includes a measurement device 1401, a controller 1402, and the image processing device 100 as a drive control system. The image processing device 100-2 according to the second embodiment may be included instead of the image processing device 100.

The measurement device 1401 is, for example, a device that measures a distance to an object ahead of the vehicle 1400 by the LIDAR method to output a distance image. The image processing device 100 receives the distance image output from the measurement device 1401 and performs the procedure above to output a second image. The controller 1402 controls the operation of the vehicle 1400 in accordance with the second image.

The vehicle 1400 is not limited to a four-wheel automobile illustrated in FIG. 14, and may be a motorcycle, a bicycle, or a railway vehicle. The image processing device may be installed in a flying body (e.g., a drone) and a movable body such as a robot other than the vehicle 1400.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
    a storage configured to store therein an input image; and
    an image processor configured to:
        use a first convolutional network (CNN) to segment the input image into a plurality of regions;
        convert pixel values of pixels in a first region included in the regions into a same first value to generate a first image; and
        use a second CNN to interpolate pixel values in the first region and reduce noise in regions other than the first region to generate a second image.

2. The image processing device according to claim 1, wherein
    the input image is a distance image including pixels having a value indicating a distance, and
    the first region is a region estimated to be noisy by the first CNN.

3. The image processing device according to claim 1, wherein the image processor is configured to:
    generate a plurality of first images,
    use any one of a plurality of second CNNs on each of the first images to generate a plurality of second images, and
    combine the second images to generate a third image.

4. The image processing device according to claim 3, wherein the image processor is configured to use a weighted average of pixel values of respective pixels in the second images as a pixel value of a corresponding pixel in the third image.

5. An image processing method comprising:
    using a first convolutional network (CNN) to segment an input image into a plurality of regions;
    converting pixel values of pixels in a first region included in the regions into a same first value to generate a first image; and
    using a second CNN to interpolate pixel values in the first region and reduce noise in regions other than the first region to generate a second image.

6. A computer program product having a non-transitory computer readable medium including programmed instructions, wherein the instructions, when executed by a computer, cause the computer to perform:
    using a first convolutional network (CNN) to segment an input image into a plurality of regions;

converting pixel values of pixels in a first region included in the regions into a same first value to generate a first image; and using a second CNN to interpolate pixel values in the first region and reduce noise in regions other than the first region to generate a second image.

\* \* \* \* \*